Aug. 23, 1955
D. M. HALL, SR
2,716,238
FILTER CLEANING AND DRYING APPARATUS
Filed April 3, 1953
2 Sheets-Sheet 2
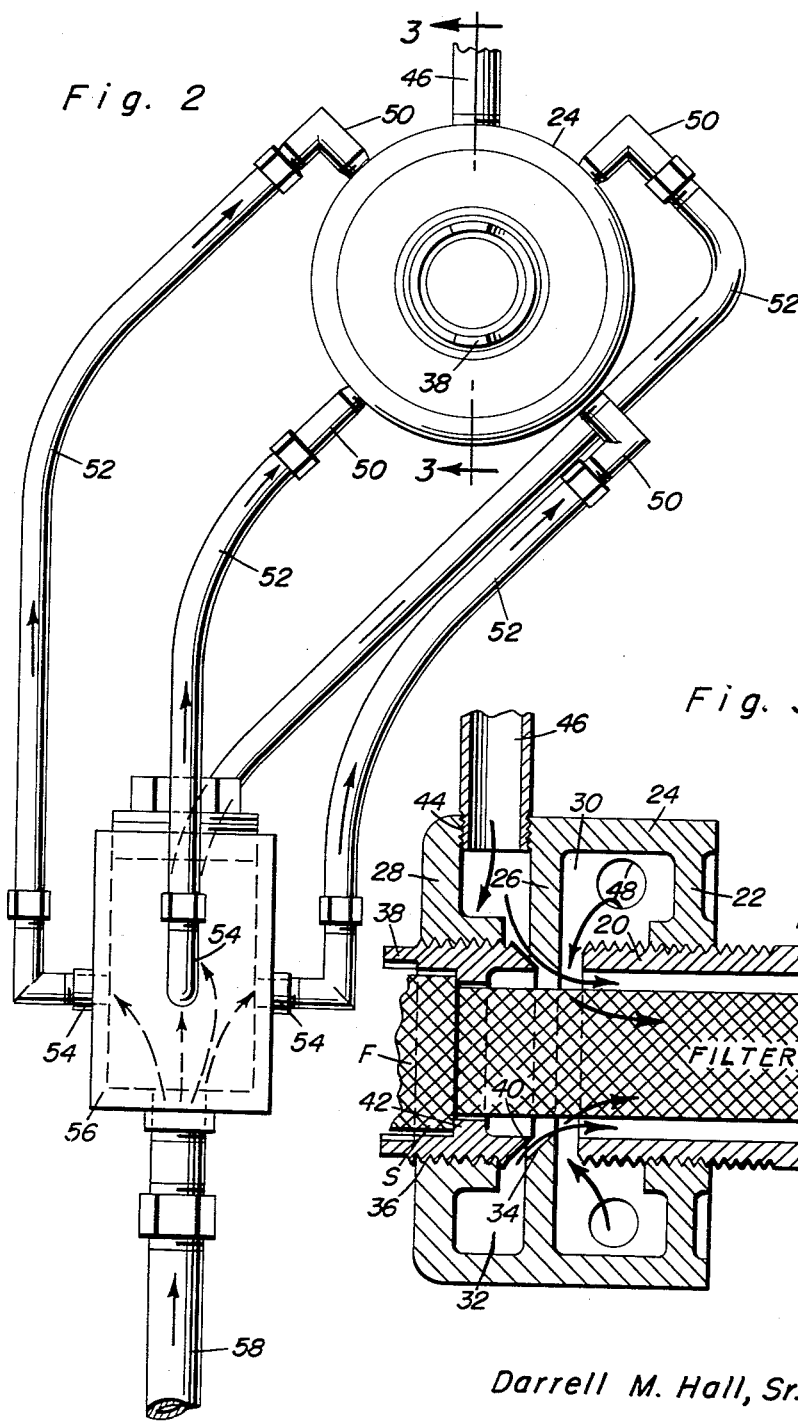
Darrell M. Hall, Sr. INVENTOR.
BY Clarence A. O'Brien
and Harvey B. Jacobson
Attorneys

United States Patent Office 2,716,238
Patented Aug. 23, 1955

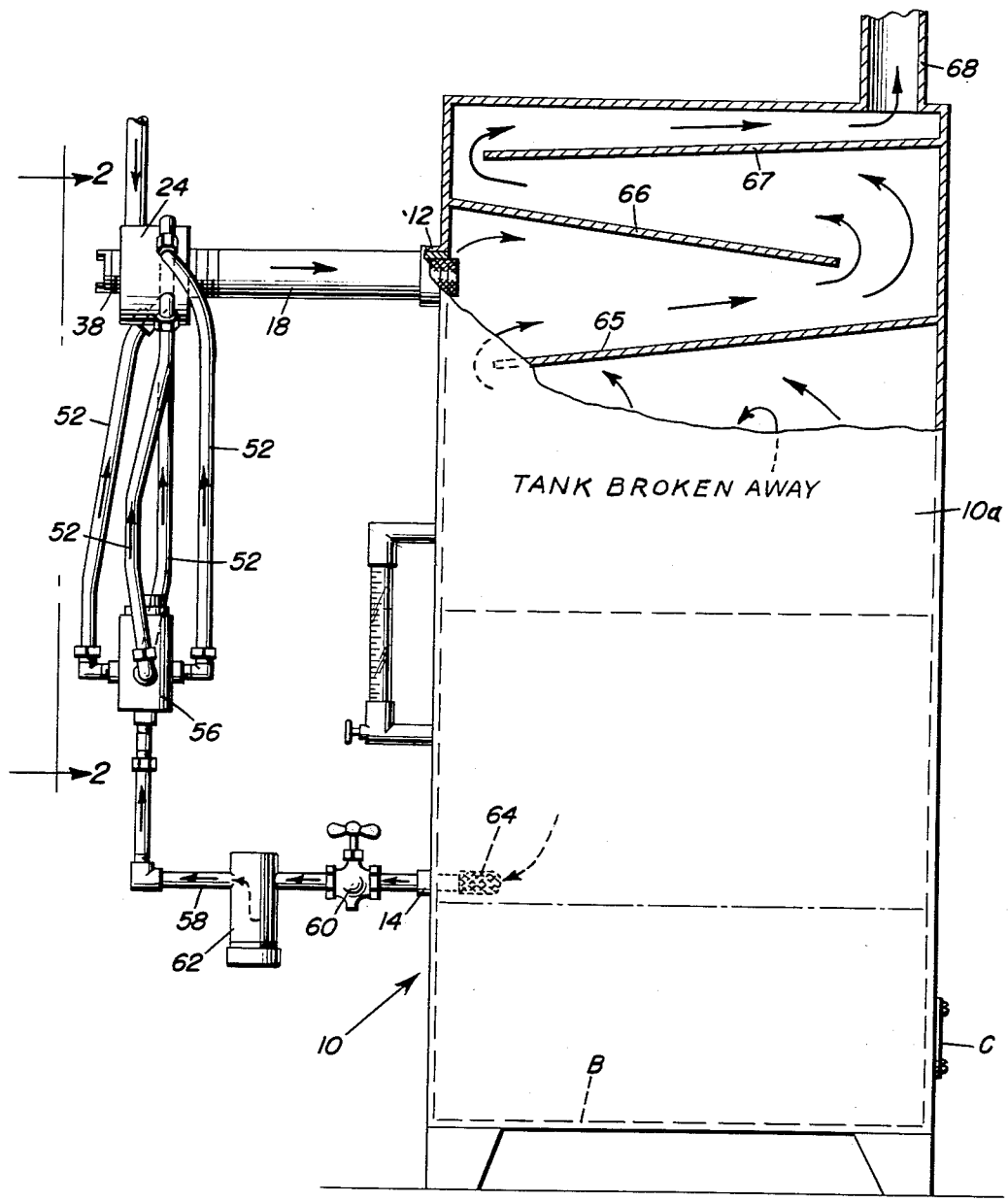

2,716,238

FILTER CLEANING AND DRYING APPARATUS

Darrell M. Hall, Sr., White Oak, Ky.

Application April 3, 1953, Serial No. 346,637

6 Claims. (Cl. 134—102)

This invention relates to new and useful improvements in cleaning apparatus and the primary object of the present invention is to provide a device for effectively cleaning and drying filters in a convenient manner.

Another important object of the present invention is to provide a filter cleaning and drying apparatus involving a filter holding means through which a mixture of air and cleaning solution is directed to clean a filter and valve means for the air and cleaning solution that are adjustable to vary the drying action and the cleaning process on a filter.

A further object of the present invention is to provide a filter cleaning and drying apparatus embodying a novel and improved valve means whereby the proportion of air and cleaning solution mixture may be varied by minor adjustments.

A still further aim of the present invention is to provide an air control filter laundry and dryer that is extremely simple and practical in construction, strong and reliable in use, efficient and durable in operation, small and compact in structure, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the present invention and with parts broken away and shown in section for the convenience of explanation;

Figure 2 is an enlarged fragmentary vertical sectional view taken substantially on the plane of section line 2—2 of Figure 1; and Figure 3 is an enlarged detailed vertical sectional view taken substantially on the plane of section line 3—3 of Figure 2.

Referring now to the drawings in detail, wherein for the purpose of illustration, there is disclosed a preferred embodiment of the present invention, the numeral 10 represents the filter cleaning and drying apparatus generally including a cleaning solution-containing tank 10a having an upper inlet opening 12 and a lower outlet opening 14. The inner threaded end 16 of a tubular filter holder 18 is threadably engaged in the inlet opening 12 and the outer threaded end 20 of holder 18 is receivably engaged in a central threaded opening in the inner end wall 22 of a cylindrical housing member 24. A partition 26 formed with member 24 between and parallel to the inner and outer end walls 22 and 28 of member 24 divides the member 24 into a cleaning solution chamber 30 and an air chamber 32.

Partition 26 is formed with a central beveled or conical opening 34 having its enlarged entrance end facing a central threaded opening 36 in end wall 28. A combined filter retainer and valve sleeve 38 is threaded in opening 36 and includes an inner beveled end 40 complemental to the bevel of opening 34. The combined filter retainer and valve sleeve 38 is provided with an internal rib 42 that will abut the shoulder portion S of a filter F to prevent the filter from being moved longitudinally in holder 18 toward end 16 thereof.

Housing member 24 is provided with a radial port 44 communicating with chamber 32 and accommodating one end of an air supply pipe 46 which extends to a suitable source of air under pressure, such as a compressor or the like, whereby air under pressure may be admitted into chamber 32 to pass through tube 18 by way of the space between valve end 40 and opening 34. The valve sleeve 38 may be adjusted to seat the end 40 in the opening 34 to cut off the supply of air to the holder 18 or may be adjusted to any desired position to vary the amount of air entering the holder 18.

A plurality of circumferentially spaced ports 48 in the cylindrical wall member 24 communicate with chamber 30 and receive nipples 50 that are coupled to liquid supply tubes or conduits 52. The free end of conduits 52 are coupled to nipples 54 projecting outwardly from a supply head 56 and the head 56 is connected by a conduit system 58 to the outlet 14 of tank 10a. The conduit system 58 is provided with a control valve 60, a filter unit 62 and a strainer 64, the latter being disposed within the tank 10a.

The upper portion of tank 10a is provided with a series of staggered baffles 65, 66, 67 extending toward an outlet 68 at the upper end of the tank. The lower or bottom baffle 65 is used to prevent the air from agitating the cleaning solution, thus allowing dirt, foreign matter, water and the like, to settle into the sediment basin B in the lower end of the tank below outlet 14. The accumulation of material collecting in the basin B may be readily removed through a clean out opening in the tank covered by a removable closure C by draining off the fluid in the tank through the removable closure C or by any other suitable means.

The two top baffles 66 and 67 are used to collect the cleaning solution that assumes the form of a mist and return same to tang 10a, thus preventing a portion of the cleaning solution from escaping from tank 10a through outlet 68 with the air.

In practical use of the present invention, the filter F is inserted through sleeve 38 into the tubular holder 18. The outer periphery of the filter is spaced radially inwardly from the inner periphery of holder 18 so that an air-liquid mixture entering the holder 18 will pass about the filter F to clean the same.

Valve 60 will prevent the cleaning solution from being drained from tank 10a when the element of filter 62 is being replaced or cleaned, or when any other repairs are being made on the system.

Sleeve 18 is adjustable by hand and will move member 24 away from or toward tank 10a to vary the space between end 20 of sleeve 18 and partition member 26, thereby increasing or decreasing the supply of cleaning solution being circulated through the system.

Air is directed by beveled end 40 of valve 38 and bevel of opening 34 in member 26 to hit filter F at the desired angle to produce the drying action. As filter F extends from the cleaning head back through valve sleeve 38, the air hits filter F well behind the supply of cleaning solution. At this point the air is a drying agent only and the cleaning solution is forced ahead of the air during the cleaning process. As the air passes the beveled opening of member 26 and crosses the adjustable space between partition 26 and end 20 of adjustable sleeve 18, the air becomes the force used to create the suction necessary to draw the cleaning solution from tank 10a.

What is claimed as new is as follows:

1. An apparatus for cleaning and drying filters, said apparatus comprising a liquid containing tank having a lower outlet opening and upper inlet opening, a filter holding tube secured in said inlet, a housing member secured on said tube and having a partition therein dividing the housing member into a cleaning solution chamber and an air chamber, conduit means communicating the cleaning solution chamber of said housing member with the outlet opening, whereby a cleaning solution may be admitted into said cleaning solution chamber from said tank, an air pressure line connected to the air chamber, and valve means carried by the member for controlling the flow of air under pressure entering said filter holding tube.

2. An apparatus for cleaning and drying filters, said apparatus comprising a liquid containing tank having a lower outlet opening and upper inlet opening, a filter holding tube secured in said inlet, a housing member secured on said tube and having a partition therein dividing the housing member into a cleaning solution chamber and an air chamber, conduit means communicating the cleaning solution chamber of said housing member with the outlet opening, whereby a cleaning solution may be admitted into said cleaning solution chamber from said tank, an air pressure line connected to the air chamber, and valve means carried by the member for controlling the flow of air under pressure entering said filter holding tube, said housing member having an inner end wall provided with a threaded opening receivably engaging the tube and permitting longitudinal adjustment of said member on said tube to selectively move the partition toward and away from the tube to vary the space between the tube and the partition and thereby regulate the passage for a cleaning solution entering the tube through the cleaning solution chamber.

3. An apparatus for cleaning and drying filters, said apparatus comprising a liquid containing tank having a lower outlet opening and an upper inlet opening, a filter holding tube secured in said inlet, a housing member secured on said tube and having a partition therein dividing the housing member into a cleaning solution chamber and an air chamber, conduit means communicating the cleaning solution chamber of said housing member with the outlet opening, whereby a cleaning solution may be admitted into said cleaning solution chamber from said tank, an air pressure line connected to the air chamber, said housing member having an outer end wall provided with a threaded opening, said partition having an opening in registry with the opening in said outer end wall, and a combined filter retainer and valve threaded in the opening in said outer end wall and adjustable toward and away from said partition for varying the space between the partition and the combined retainer and valve through which air under pressure passes from the air chamber and into the tube.

4. The combination of claim 3 wherein said opening in said partition is conical and said combined valve and retainer including a tubular element with an end beveled complemental to the opening.

5. A filter cleaning attachment for solution containing tanks, said attachment comprising a tubular filter holder having an outer end, a cylindrical housing member having inner and outer end walls each of which is provided with a central opening, the central opening in said inner end wall accommodating the outer end of the holder, said member including a partition spaced between and parallel to said end walls, said partition having an opening in registry with said end wall openings and dividing the member into first and second chambers one of which is adapted to be connected to a source of cleaning solution and the other of which is adapted to be connected to a source of air under pressure, and valve means carried by the member in the opening in said outer end wall and controlling the passage of air under pressure into the tube from the chamber that is adapted to be connected to a source of air under pressure.

6. A filter cleaning attachment for solution containing tanks, said attachment comprising a tubular filter holder having an outer end, a cylindrical housing member having inner and outer end walls each of which is provided with a central opening, the central opening in said inner end wall accommodating the outer end of the holder, said member including a partition spaced between and parallel to said end walls, said partition having an opening in registry with said end wall openings and dividing the member into first and second chambers one of which is adapted to be connected to a source of cleaning solution and the other of which is adapted to be connected to a source of air under pressure, and a combined filter retained and valve member threadably received in the opening and adjustable selectively toward and away from the partition to control the passage between the partition and the first chamber.

No references cited.